(12) United States Patent
Nakano et al.

(10) Patent No.: US 11,084,495 B2
(45) Date of Patent: Aug. 10, 2021

(54) MONITORING APPARATUS, MONITORING METHOD, AND PROGRAM

(71) Applicant: PANASONIC INTELLECTUAL PROPERTY MANAGEMENT CO., LTD., Osaka (JP)

(72) Inventors: Toshihisa Nakano, Osaka (JP); Jun Anzai, Kanagawa (JP); Kaoru Yokota, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 16/250,545

(22) Filed: Jan. 17, 2019

(65) Prior Publication Data
US 2019/0217870 A1 Jul. 18, 2019

(30) Foreign Application Priority Data

Jan. 17, 2018 (JP) .............................. JP2018-005962

(51) Int. Cl.
*B60W 50/02* (2012.01)
*B60W 50/04* (2006.01)
*B60W 50/00* (2006.01)

(52) U.S. Cl.
CPC ...... *B60W 50/0205* (2013.01); *B60W 50/045* (2013.01); *B60W 2050/0004* (2013.01); *B60W 2050/021* (2013.01); *B60W 2050/046* (2013.01)

(58) Field of Classification Search
CPC ..... H04W 24/08; H04W 4/38; B60W 50/023; B60W 50/04; B60W 40/10; B60W 40/12;
(Continued)

(56) References Cited

U.S. PATENT DOCUMENTS

| 7,801,963 | B2 * | 9/2010 | von Schwertfuehrer .................... H04L 29/06 709/208 |
| 8,516,176 | B1 * | 8/2013 | Sleator .................... G06F 13/00 710/110 |
| 8,885,671 | B1 * | 11/2014 | Steinbach ............... H03M 1/08 370/516 |
| 9,947,144 | B2 * | 4/2018 | Kim .................... G06F 11/3024 |

(Continued)

FOREIGN PATENT DOCUMENTS

| JP | 6147356 | 5/2017 |
| WO | 2015/083251 | 6/2015 |

*Primary Examiner* — Abby Y Lin
*Assistant Examiner* — Esvinder Singh
(74) *Attorney, Agent, or Firm* — Greenblum & Bernstein, P.L.C.

(57) ABSTRACT

A master control device is communicatively coupled to a first slave control device and a second slave control device via a first network and a second network, respectively. The master control device provides output data to the first slave control device based on input data received from the second slave control device. A monitoring apparatus which monitors an operation of the master control device stores determination data indicating a correspondence relationship between the input data and the output data, obtains the input data provided to the second network by the second slave control device and the output data provided to the first slave control device via the first network, and determines a presence or an absence of an anomaly in the operation of the master control device by determining whether the input data and the output data correspond to the determination data.

19 Claims, 11 Drawing Sheets

(58) Field of Classification Search
CPC ..... B60W 2050/0005; B60W 50/0205; B60W
50/045; B60W 2050/0004; B60W
2050/021; B60W 2050/046; B60W
2050/0006; B60W 20/50; B60W
2050/0001; B60W 2050/0002; B60W
2050/0064; B60W 2050/0077; B60W
2556/45; B60W 2756/10; G05B
2219/1215; G05B 2219/21005; G05B
23/0205; G05B 23/0208; G05B
2219/1195; G05B 2219/24021; G06F
11/0739; G06F 11/079; G06F 11/0751;
G06F 9/226; G06F 11/0745; G06F
11/3041; G06F 11/3003; G06F 11/34;
G06F 11/3013; G06F 11/3452; G06F
11/3476; G06F 11/3485; G06F 11/3024
See application file for complete search history.

(56) References Cited

U.S. PATENT DOCUMENTS

| | | | |
|---|---|---|---|
| 10,776,538 B2* | 9/2020 | Ting | G06F 30/20 |
| 2015/0206825 A1* | 7/2015 | Park | G11C 5/063 |
| | | | 365/198 |
| 2016/0217023 A1* | 7/2016 | Wada | G06F 11/0739 |
| 2018/0237148 A1* | 8/2018 | Hehn | B64C 39/024 |
| 2019/0009797 A1* | 1/2019 | Liu | G05D 1/0061 |
| 2019/0094830 A1* | 3/2019 | Nishikawa | G05B 19/0428 |
| 2019/0098558 A1* | 3/2019 | Yanagida | H04W 72/04 |
| 2019/0111907 A1* | 4/2019 | Harata | G06F 8/65 |
| 2019/0173862 A1* | 6/2019 | Kim | H04L 9/3242 |
| 2019/0190423 A1* | 6/2019 | Kurokawa | H02P 21/22 |
| 2020/0133757 A1* | 4/2020 | Sung | H04W 84/20 |

* cited by examiner

FIG. 3A

| Identification information | Input data value | Output data value |
|---|---|---|
| 0x111 | X | X |
| 0x222 | Y | Y |
| : | : | : |

FIG. 3B

| Identification information | Input data value | Output data value |
|---|---|---|
| 0x123 | X | X+50 |
| 0x234 | Y | 3*Y |
| 0x345 | Z | Z+ "CAN ID 0x111" |
| : | : | : |

FIG. 7A

Output rule 1

| Identification information | Difference value from previous data |
|---|---|
| 0x111 | 50 < Difference value < 200 |
| : | : |

FIG. 7B

Output rule 2

| Identification information | Output cycle |
|---|---|
| 0x123 | Within 20 ms ± 20% |
| : | : |

FIG. 7C

Output rule 3

| Identification information of data provided by slave control device including monitoring apparatus |
|---|
| 0x056 |
| : | ns
MONITORING APPARATUS, MONITORING METHOD, AND PROGRAM

CROSS REFERENCE TO RELATED APPLICATION

The present application is based on and claims priority of Japanese Patent Application No. 2018-005962 filed on Jan. 17, 2018. The entire disclosure of the above-identified application, including the specification, drawings and claims is incorporated herein by reference in its entirety.

FIELD

The present disclosure relates to a monitoring apparatus, a monitoring method, and a program.

BACKGROUND

A monitoring apparatus which monitors control devices for monitoring functions in equipment of various kinds included in an automobile, etc. has been examined. For example, Patent Literature 1 discloses a monitoring apparatus which monitors a control device including a master control device and a slave control device which are communicatively coupled to a bus in-vehicle network. The monitoring apparatus according to Patent Literature 1 diagnoses an anomaly of the master control device on the basis of communication data between the master control device and the slave control device.

CITATION LIST

Patent Literature

[Patent Literature 1] Japanese Patent No. 6147356

SUMMARY

Technical Problem

The monitoring apparatus disclosed by Patent Literature 1 monitors a master control device communicatively coupled to a slave control device via a single bus in-vehicle network.

The present disclosure provides a monitoring apparatus, a monitoring method, and a program which enable monitoring of a master control device communicatively coupled to a plurality of slave control devices via different networks.

Solution to Problem

A monitoring apparatus according to a first aspect of the present disclosure is a monitoring apparatus which monitors an operation of a master control device, the master control device being communicatively coupled to a first slave control device via a first network and to a second slave control device via a second network, and providing input data received from the second slave control device, to the first slave control device as output data. The monitoring apparatus is communicatively coupled to the first network and the second network, and includes: a storage which stores determination data indicating a correspondence relationship between the input data and the output data; a first obtaining unit configured to obtain (i) the input data provided to the second network by the second slave control device and (ii) the output data provided to the first network by the master control device; and a determination unit configured to determine presence or absence of an anomaly in the operation of the master control device, by determining whether the input data and the output data obtained by the first obtaining unit satisfy the determination data.

A monitoring apparatus according to a second aspect of the present disclosure is a monitoring apparatus which monitors an operation of a master control device, the master control device being communicatively coupled to a first slave control device via a first network and to a second slave control device via a second network, and providing input data received from the second slave control device, to the first slave control device as output data. The monitoring apparatus is included in the first slave control device, and includes: a storage which stores determination data on the output data; a first obtaining unit configured to obtain the output data provided by the master control device to the first slave control device via the first network; and a determination unit configured to determine presence or absence of an anomaly in the operation of the master control device, by determining whether the output data obtained satisfies the determination data.

A monitoring method according to a first aspect of the present disclosure is a monitoring method for monitoring an operation of a master control device, the master control device being communicatively coupled to a first slave control device via a first network and to a second slave control device via a second network, and providing input data received from the second slave control device, to the first slave control device as output data. The monitoring method includes: obtaining (i) the input data provided to the second network by the second slave control device and (ii) the output data provided to the first network by the master control device, via the first network and the second network; and determining presence or absence of an anomaly in the operation of the master control device, by determining whether the input data obtained and the output data obtained satisfy determination data indicating a correspondence relationship between the input data and the output data.

A monitoring method according to a second aspect of the present disclosure is a monitoring method for monitoring an operation of a master control device, the master control device being communicatively coupled to a first slave control device via a first network and to a second slave control device via a second network, and providing input data received from the second slave control device, to the first slave control device as output data. The monitoring method includes: obtaining the output data provided by the master control device to the first slave control device via the first network; and determining presence or absence of an anomaly in the operation of the master control device, by determining whether the output data obtained satisfies determination data on the output data.

A program according to a first aspect of the present disclosure is a program for causing a computer to execute the monitoring method according to the first aspect of the present disclosure.

A program according to a second aspect of the present disclosure is a program for causing a computer to execute the monitoring method according to the second aspect of the present disclosure.

These general and specific aspects may be implemented using a system, an apparatus, a method, an integrated circuit, a computer program, or a computer-readable recording medium such as a recording disk, or any combination of systems, apparatuses, methods, integrated circuits, computer programs, or computer-readable recording media. The computer-readable recording medium includes, for example, a non-volatile recording medium such as a compact disc-read only memory (CD-ROM).

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

With the technique according to the present disclosure, it is possible to monitor a master control device communicatively coupled to a plurality of slave control devices via different networks.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3A is a diagram which illustrates one example of determination data indicating a correspondence relationship between input data and output data when a master control device does not apply arithmetic processing to the input data.

FIG. 3B is a diagram which illustrates one example of determination data indicating a correspondence relationship between input data and output data when the master control device applies arithmetic processing to the input data.

FIG. 7A is a diagram which illustrates one example of determination data in the monitoring apparatus according to Embodiment 2.

FIG. 7B is a diagram which illustrates one example of determination data in the monitoring apparatus according to Embodiment 2.

FIG. 7C is a diagram which illustrates one example of determination data in the monitoring apparatus according to Embodiment 2.

DESCRIPTION OF EMBODIMENTS

Figure 1:
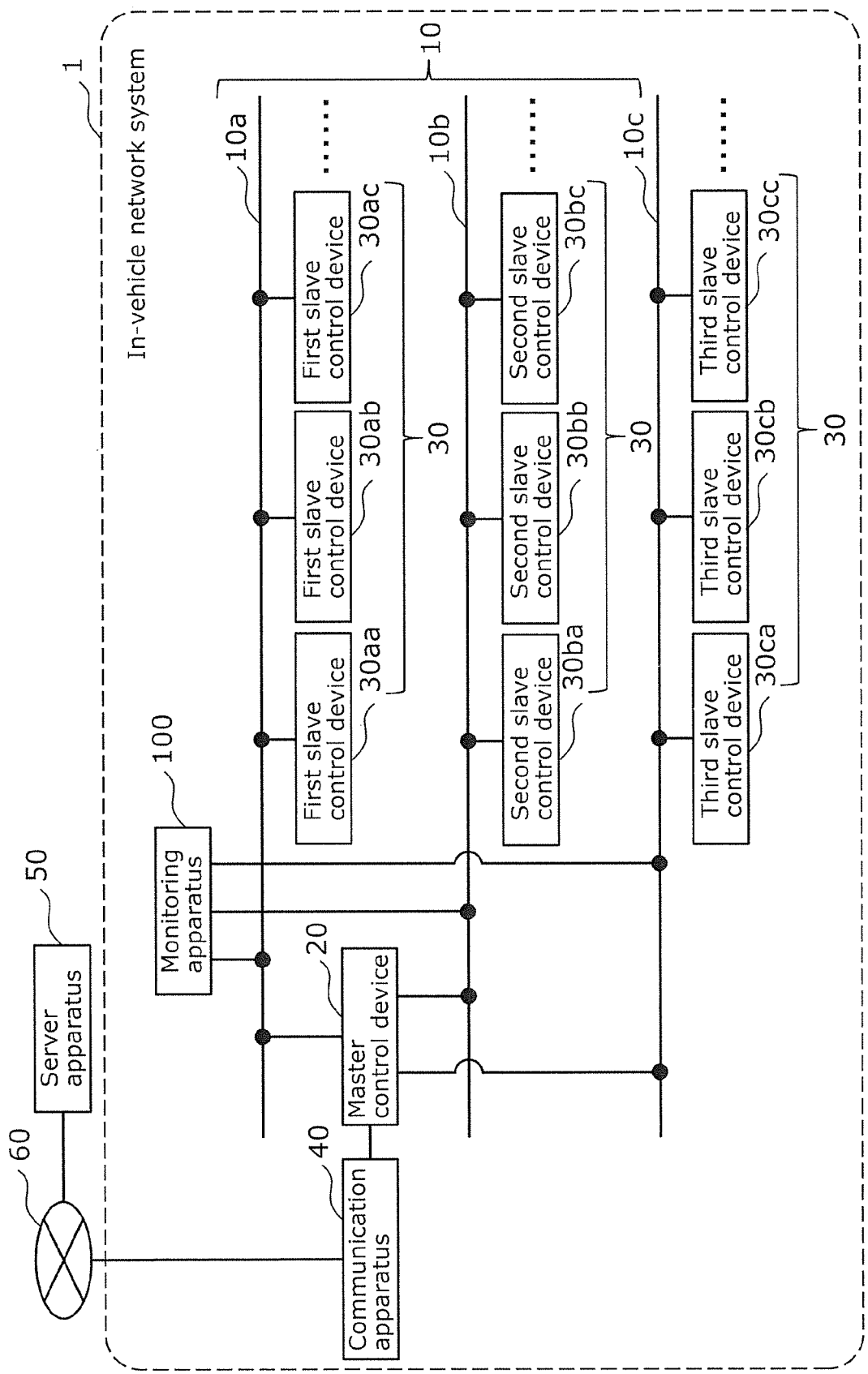
FIG. 1 is a block diagram which illustrates one example of a functional configuration of an in-vehicle network system including a monitoring apparatus according to Embodiment 1.

The inventors of the present disclosure have examined a technique of monitoring control devices which are mounted on various equipment included in an automobile, etc., and are communicatively coupled to one another via a network. For example, the automobile includes a plurality of networks. Examples of the plurality of networks include: a network to which an external interface such as an in-vehicle infotainment (IVI) and a communication module, etc. are communicatively coupled, a network to which a control device for controlling accessory devices of the automobile such as a mirror, a window, etc. are communicatively coupled, and a network to which a control device for controlling a driving device of the automobile such as an engine, a transmission, etc. are communicatively coupled. In addition, a control device which communicatively couples between the above-described networks, such as a gateway, is provided as a master control device. The master control device controls communication over a plurality of networks between control devices and an external interface.

The master control device as described above is directly connected to the external interface, and thus carries a high risk of being attacked from outside via the external interface. When the master control device is highjacked as a result of program alteration, etc., intrusion from outside to the network cannot be detected. For example, the monitoring apparatus according to Patent Literature 1 monitors an anomaly of a master control device on the basis of communication between slave control devices and the master control device which are communicatively coupled to a single network, but cannot monitor an anomaly of the master control device on the basis of communication over two networks. For that reason, accuracy is low in detecting an anomaly. In view of the above, the inventors of the present disclosure have conceived as below a technique which enables monitoring of a master control device communicatively coupled to a plurality of slave control devices via different networks.

For example, a monitoring apparatus according to one aspect of the present disclosure is a monitoring apparatus which monitors an operation of a master control device, the master control device being communicatively coupled to a first slave control device via a first network and to a second slave control device via a second network, and providing input data received from the second slave control device, to the first slave control device as output data. The monitoring apparatus is communicatively coupled to the first network and the second network, and includes: a storage which stores determination data indicating a correspondence relationship between the input data and the output data; a first obtaining unit configured to obtain (i) the input data provided to the second network by the second slave control device and (ii) the output data provided to the first network by the master control device; and a determination unit configured to determine presence or absence of an anomaly in the operation of the master control device, by determining whether the input data and the output data obtained by the first obtaining unit satisfy the determination data.

According to the above-described aspect, the determination unit determines presence or absence of an anomaly in an operation of the master control device, by comparing, with the determination data, input data provided to the second network for the master control device and output data provided to the first network from the master control device. Accordingly, the determination unit determines presence or absence of an anomaly in the operation of the master control device, using data passing through different networks. Thus, the monitoring apparatus enables monitoring of the master control device communicatively coupled to a plurality of slave control devices via different in-vehicle networks.

In addition, in the monitoring apparatus according to the one aspect of the present disclosure, the determination data may indicate at least one of a relationship in which the input data and the output data are identical or a relationship in which the output data is identical to a result of arithmetic processing applied to the input data by the master control device.

According to the above-described aspect, it is possible to readily and surely determine presence or absence of an anomaly in the operation of the master control device, based on the determination data.

A monitoring apparatus according to another aspect of the present disclosure is a monitoring apparatus which monitors an operation of a master control device, the master control device being communicatively coupled to a first slave control device via a first network and to a second slave control device via a second network, and providing input data received from the second slave control device, to the first slave control device as output data. The monitoring apparatus is included in the first slave control device, and includes: a storage which stores determination data on the output data; a first obtaining unit configured to obtain the output data provided by the master control device to the first slave control device via the first network; and a determination unit configured to determine presence or absence of an anomaly in the operation of the master control device, by determining whether the output data obtained satisfies the determination data.

According to the above-described aspect, the determination unit determines presence or absence of an anomaly in the operation of the master control device, by comparing the determination data with output data provided by the master control device to the first slave control device via the first network. In addition, the master control device provides the input data received from the second slave control device, to the first slave control device as output data. Accordingly, the determination unit is capable of determining presence or absence of an anomaly in the operation of the master control device, using data passing through different networks. Thus, the monitoring apparatus enables monitoring of the master control device communicatively coupled to a plurality of slave control devices via different networks.

In the monitoring apparatus according to the other aspect of the present disclosure, the determination data may indicate at least one of an amount of change in the output data, an output cycle at which the master control device provides the output data, or data on the first slave control device including the monitoring apparatus.

According to the above-described aspect, it is possible to readily and surely determine presence or absence of an anomaly in the operation of the master control device, based on the determination data.

A monitoring apparatus according to the one aspect or the other aspect of the present disclosure may further include a second obtaining unit configured to obtain information from an information transmitter provided separately from the first network and the second network, and the determination unit may be configured to determine whether data resulting from processing, based on the information obtained by the second obtaining unit, the output data obtained by the first obtaining unit satisfies the determination data stored in the storage.

According to the above-described aspect, the information obtained by the second obtaining unit may include information related to the slave control device that has provided the input data corresponding to the output data. The data resulting from processing, based on the information obtained by the second obtaining unit, the output data obtained by the first obtaining unit can be data in which impact on output data caused by an anomaly, an accident, etc. in the slave control device or in a device communicatively coupled to the slave control device is taken into consideration. In this manner, the determination unit is capable of reducing false detection of an anomaly in the operation of the master control device due to the above-described impact. Accordingly, the monitoring apparatus is capable of improving accuracy in determining an anomaly in the operation of the master control device.

In the monitoring apparatus according to the one aspect or the other aspect of the present disclosure, the first network and the second network may be bus networks.

In the monitoring apparatus according to the one aspect or the other aspect of the present disclosure, the master control device may be a gateway.

In addition, a monitoring method according to one aspect of the present disclosure is a monitoring method for monitoring an operation of a master control device, the master control device being communicatively coupled to a first slave control device via a first network and to a second slave control device via a second network, and providing input data received from the second slave control device, to the first slave control device as output data. The monitoring method includes: obtaining (i) the input data provided to the second network by the second slave control device and (ii) the output data provided to the first network by the master control device, via the first network and the second network; and determining presence or absence of an anomaly in the operation of the master control device, by determining whether the input data obtained and the output data obtained satisfy determination data indicating a correspondence relationship between the input data and the output data. According to the above-described aspect, it is possible to obtain an advantageous effect equivalent to the advantageous effect yielded by the monitoring apparatus according to the one aspect of the present disclosure.

A monitoring method according to another aspect of the present disclosure is a monitoring method for monitoring an operation of a master control device, the master control device being communicatively coupled to a first slave control device via a first network and to a second slave control device via a second network, and providing input data received from the second slave control device, to the first slave control device as output data. The monitoring method includes: obtaining the output data provided by the master control device to the first slave control device via the first network; and determining presence or absence of an anomaly in the operation of the master control device, by determining whether the output data obtained satisfies determination data on the output data. According to the above-described aspect, it is possible to obtain an advantageous effect equivalent to the advantageous effect yielded by the monitoring apparatus according to the other aspect of the present disclosure.

In addition, a program according to one aspect of the present disclosure is a program for causing a computer to execute the monitoring method according to the one aspect of the present disclosure. According to the above-described aspect, it is possible to obtain an advantageous effect equivalent to the advantageous effect yielded by the monitoring apparatus according to the one aspect of the present disclosure.

A program according to another aspect of the present disclosure is a program for causing a computer to execute the monitoring method according to the other aspect of the present disclosure. According to the above-described aspect, it is possible to obtain an advantageous effect equivalent to the advantageous effect yielded by the monitoring apparatus according to the other aspect of the present disclosure.

It should be noted that these general and specific aspects may be implemented using a system, an apparatus, a method, an integrated circuit, a computer program, or a computer-readable recording medium such as a recording disk, or any combination of systems, apparatuses, methods, integrated circuits, computer programs, or computer-readable recording media. The computer-readable recording medium includes, for example, a non-volatile recording medium such as a compact disc-read only memory (CD-ROM). In addition, the apparatus may comprise one or more apparatuses. When the apparatus comprises two or more apparatuses, the two or more apparatuses may be disposed in a single device, or may be individually disposed in two or more separate devices. In the Specification and Claims, "apparatus" means not only a single apparatus, but also a system including a plurality of apparatuses.

Hereinafter, a monitoring apparatus according to the present disclosure will be described with reference to the Drawings. Each of the embodiments described below shows a general or specific example. The numerical values, shapes, structural components, the arrangement and connection of the structural components, steps (processes), the processing order of the steps, etc. shown in the following embodiments are mere examples, and therefore do not limit the scope of the claims of present disclosure. Therefore, among the structural components in the following embodiments, structural components not recited in any one of the independent claims are described as arbitrary structural components. In addition, each diagram is a schematic diagram and not necessarily strictly illustrated. In each of the diagrams, substantially the same structural components are assigned with the same reference signs, and redundant descriptions will be omitted or simplified.

Embodiment 1

The following describes a monitoring apparatus 100 according to Embodiment 1. In the following embodiment, the monitoring apparatus 100 is described as a device which monitors a master control device that communicatively couples a plurality of networks mounted on a vehicle. It should be noted that the subject monitored by the monitoring apparatus 100 is not limited to a master control device in an in-vehicle network, and may be a master control device which communicatively couples a plurality of networks for any equipment.

1-1. Configuration of Monitoring Apparatus

The following describes configurations of the monitoring apparatus 100 and surrounding components according to Embodiment 1. FIG. 1 illustrates a block diagram of one example of a functional configuration of an in-vehicle network system 1 including the monitoring apparatus 100 according to Embodiment 1. The in-vehicle network system 1 includes: a plurality of in-vehicle networks 10; a master control device 20 which communicatively couples the plurality of in-vehicle networks 10 one another; slave control devices 30 communicatively coupled respectively to the in-vehicle networks 10; a communication apparatus 40; and the monitoring apparatus 100 which monitors the master control device 20.

The in-vehicle network 10 communicatively couples the master control device 20 to each of the slave control devices 30. According to the present embodiment, the in-vehicle network 10 includes a first in-vehicle network 10a, a second in-vehicle network 10b, and a third in-vehicle network 10c. The in-vehicle network 10 may include any number of networks as long as at least two networks are included. The first to third in-vehicle networks 10a to 10c are networks independent of each other. Each of the first to third in-vehicle networks 10a to 10c does not communicatively couples the master control device 20 and the slave control devices 30 on a one to one basis, but is assumed to be a bus network in which a signal output to the in-vehicle network is received by the master control device 20 and all of the slave control devices 30 communicatively coupled to the in-vehicle network. For example, in FIG. 1, when the master control device 20 transmits a signal to one of the slave control devices 30 in one of the in-vehicle networks, any of the slave control devices 30 in the one of the in-vehicle networks is capable of receiving the signal. One example of the first to third in-vehicle networks 10a to 10c is a controller area network (CAN). Here, one of the first to third in-vehicle networks 10a to 10c is one example of a first network, and another one of the first to third in-vehicle networks 10a to 10c is one example of a second network.

The master control device 20 communicatively couples the first to third in-vehicle networks 10a to 10c one another. In other words, the master control device 20 is communicatively coupled to each of the first to third in-vehicle networks 10a to 10c. The master control device 20 obtains input data provided by the slave control device 30, and provides the obtained input data to the slave control device 30 as output data. More specifically, the master control device 20 controls transmitting and receiving of a signal between the slave control devices 30 communicatively coupled to the same in-vehicle network among the first to third in-vehicle networks 10a to 10c. Furthermore, the master control device 20 controls transmitting and receiving of a signal between the slave control devices 30 communicatively coupled to different in-vehicle networks among the first to third in-vehicle networks 10a to 10c. The master control device 20 may transmit a signal provided by one of the slave control devices 30, as it is to another one of the slave control devices 30 specified by the one of the slave control devices 30, or may apply arithmetic processing to a signal provided by one of the slave control devices 30 and transmit the signal to another one of the slave control devices 30 specified by the one of the slave control devices 30. The master control device 20 is capable of identifying the one of the slave control devices 30 which provides a signal to one of the in-vehicle networks, using information such as an ID included in the signal, and identifying: the other of the slave control devices 30 which is a destination specified by the one of the slave control devices 30; and the one of the in-vehicle networks.

Furthermore, the master control device 20 communicates with a server apparatus 50 located external to the vehicle, via an external network 60 located external to the communication apparatus 40 and the vehicle. The master control device 20 accesses the server apparatus 50, transmits, to the server apparatus 50, information provided by the slave control device 30, and obtains information required by the slave control device 30 from the server apparatus 50. One example of the master control device 20 includes a gateway.

The communication apparatus 40 performs transmission and reception to and from the server apparatus 50, via the external network 60. The communication apparatus 40 may include a communication circuit or an electronic control unit (ECU). One example of the external network 60 is the Internet. One example of the communication apparatus 40 is a wireless local area network (LAN) such as Wireless Fidelity (Wi-Fi) (registered trademark). Mobile communications standards for use in a mobile communication system such as the third generation mobile communication system (3G), the fourth generation mobile communication system (4G), LTE (registered trademark), etc. may be applied to communications performed by the communication apparatus 40.

The slave control devices 30 control an operation of each of the devices in the vehicle. The slave control devices 30 include first slave control devices 30aa to 30ac each of which is communicatively coupled to the first in-vehicle network 10a, second slave control devices 30ba to 30bc each of which is communicatively coupled to the second in-vehicle network 10b, and third slave control devices 30ca to 30cc each of which is communicatively coupled to the third in-vehicle network 10c. One example of each of the slave control devices 30aa to 30ac, 30ba to 30bc, and 30ca to 30cc is the ECU.

The first slave control devices 30aa to 30ac are communicatively coupled to driving apparatuses of the vehicle which are not illustrated. Each of the first slave control devices 30aa to 30ac performs control directly related to traveling of the vehicle, and thus also referred to as an "important ECU". The first slave control devices 30aa to 30ac each control an operation of the driving apparatus in response to an instruction provided via an input device which is not illustrated. The first slave control devices 30aa to 30ac each output information related to a result of controlling the driving apparatus and a state of the driving apparatus, to the first in-vehicle network 10a. Examples of the driving apparatus include various meters, a transmission, an antilock brake system (ABS), an engine, a parking assistance device, etc. However, the driving device is not limited to these examples.

The second slave control devices 30ba to 30bc are communicatively coupled to accessory apparatuses of the vehicle which are not illustrated. The second slave control devices 30ba to 30bc each cause the accessory apparatus to operate in response to an instruction provided via an input device such as a switch which is not illustrated. The second slave control devices 30ba to 30bc each output a result of controlling the accessory apparatus, to the second in-vehicle network 10b. Examples of the accessory apparatus include an electronic mirror, an air conditioner, an in-vehicle camera, a door locking device, a power window, etc. However, the accessory apparatus is not limited to these examples.

The third slave control devices 30ca to 30cc are communicatively coupled to external interfaces which are mounted in the vehicle and are not illustrated. The third slave control devices 30ca and 30cc each output a control signal corresponding to an instruction provided to the external interface, to the third in-vehicle network 10c. The third slave control devices 30ca and 30cc each obtains, from other slave control devices, information required by the external interfaces, via the third in-vehicle network 10c. Examples of the external interface include a head unit which includes a display such as a touch panel and receives an input from a user, an on-board diagnostics (OBD) unit which outputs a result of self-diagnosis of the vehicle, a communication module, a navigation system, etc. However, the external interface is not limited to these examples.

In addition, the master control device 20 outputs information at predetermined intervals to each of the first to third in-vehicle networks 10a to 10c, and each of the slave control devices 30aa to 30ac, 30ba to 30bc, and 30ca to 30cc obtains the information provided by the master control device 20 at the predetermined intervals. One example of an interval is 20 milliseconds (ms).

As described above, the first to third in-vehicle networks 10a to 10c are established for the respective target systems to be communicatively coupled. It should be noted that the targets to which the respective in-vehicle networks are communicatively coupled are not limited to those as described above, and the target systems to which the respective in-vehicle networks are communicatively coupled are also not limited to those as described above.

Figure 2:
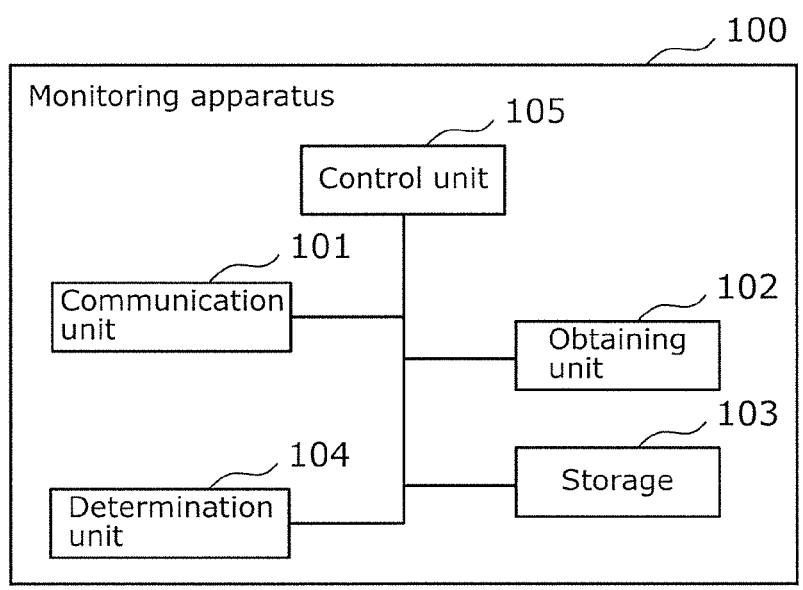
FIG. 2 is a block diagram which illustrates one example of a functional configuration of the monitoring apparatus according to Embodiment 1.

The following described a configuration of the monitoring apparatus 100. FIG. 2 is a block diagram which illustrates one example of a functional configuration of the monitoring apparatus 100 according to Embodiment 1. As illustrated in FIG. 1 and FIG. 2, the monitoring apparatus 100 is communicatively coupled to each of the first to third in-vehicle networks 10a to 10c, and monitors an operation of the master control device 20. More specifically, the monitoring apparatus 100 constantly monitors an operation of the master control device 20. The monitoring apparatus 100 includes a communication unit 101, an obtaining unit 102, a storage 103, a determination unit 104, and a control unit 105. The communication unit 101 transmits and receives data to and from the monitoring apparatus 100 and each of the first to third in-vehicle networks 10a to 10c. The communication unit 101 may include a communication circuit.

The obtaining unit 102 obtains input data from a signal which is output from each of the slave control devices 30 to the first to third in-vehicle networks 10a to 10c, and is provided to the master control device 20, via the communication unit 101. In addition, the obtaining unit 102 obtains output data included in a signal output from the master control device 20 and provided to each of the slave control devices 30 via the first to third in-vehicle networks 10a to 10c. The input data is an instruction provided by the slave control devices 30, namely a command, and includes command identification information and command contents. The output data is a command output from the master control device 20, and includes command identification information and command contents. One example of the command identification information is a CAN ID of a CAN command. The command identification information includes information such as a type of the command and/or a command execution target, etc. Such command identification information of input data and command identification information of output data may be identical or different. One example of the case where the command identification information of input data is different from the command identification information of output data includes the case where the master control device 20 changes the command identification information of input data to other command identification information, and outputs output data including the changed command identification information. Whether or not command identification information is identical or different, it is possible to identify output data corresponding to input data, based on a correspondence relationship of command identification information, as described later. In addition, the command contents include specific execution details.

The storage 103 stores determination data indicating a correspondence relationship between command contents of input data, command contents of output data, and command identification information of the input data. It should be noted that, in the Specification and Claims, "command contents" may also be referred to simply as "contents", and "command identification information" may also be referred to simply as "identification information". The output data corresponding to the input data is data that the master control device 20 which has obtained the input data outputs when the master control device is free of an anomaly.

The determination data is set in advance and stored in the storage 103. When the master control device 20 does not apply arithmetic processing to input data, the correspondence relationship indicated by the determination data shows a relationship in which contents of the input data such as a value is identical to contents of output data corresponding to the input data such as a value. When the master control device 20 applies arithmetic processing to input data, the correspondence relationship indicated by the determination data shows a relationship between contents of the input data such as a value and a result of the arithmetic processing applied to the input data. In other words, the correspondence relationship is a relationship in which the result of the arithmetic processing applied to the input data is identical to contents of output data corresponding to the input data.

For example, FIG. 3A illustrates one example of determination data indicating a correspondence relationship between identification information of input data, contents of input data, and contents of output data, when arithmetic processing is not applied to input data by the master control device 20. FIG. 3B illustrates one example of determination data indicating a correspondence relationship between identification information of input data, contents of input data, and contents of output data, when arithmetic processing is applied to input data by the master control device 20. In FIG. 3A and FIG. 3B, the contents of input data and the contents of output data are associated with each other in relation to identification information of input data.

The determination unit 104 determines whether input data obtained by the obtaining unit 102 and output data corresponding to the input data satisfy determination data in storage 103, specifically, whether to satisfy a correspondence relationship indicated by the determination data. The determination unit 104 determines that the master control device 20 is free of an anomaly when the correspondence relationship is satisfied, and determines that there is an anomaly in the master control device 20 when the correspondence relationship is not satisfied, More specifically, the determination unit 104 determines presence or absence of an anomaly of the master control device 20, based on a consistency and/or relationship between the input data and output data obtained by the obtaining unit 102 and the determination data in the storage 103.

For example, when the master control device 20 does not apply arithmetic processing to input data, the determination unit 104 identifies, in a table illustrated in FIG. 3A, a value of output data corresponding to identification information and a value of input data obtained by the obtaining unit 102. The determination unit 104 compares a value of output data in the table illustrated in FIG. 3A with a value of output data provided by the master control device 20, and determines that the correspondence relationship is satisfied when the compared values are identical. It should be noted that the determination unit 104 may identify the value of output data provided by the master control device 20, based on the identification information of input data. As described above, the identification information of input data and the identification information of output data may be identical.

When the master control device 20 applies arithmetic processing to input data, the determination unit 104 identifies, in a table illustrated in FIG. 3B, a value of output data corresponding to identification information and a value of input data obtained by the obtaining unit 102. The determination unit 104 compares a value of output data in the table illustrated in FIG. 3B with a value of output data provided by the master control device 20, and determines that the correspondence relationship is satisfied when the compared values are identical. It should be noted that the determination unit 104 may identify the value of output data provided by the master control device 20, based on the identification information of input data.

The control unit 105 controls the operations of the communication unit 101, the obtaining unit 102, and the determination unit 104 in association with one another, and controls the overall operation of the monitoring apparatus 100. In addition, the control unit 105 outputs a determination result of the determination unit 104 and/or control information based on the determination result, to the outside of the monitoring apparatus 100 via the communication unit 101. More specifically, the control unit 105 may output the above-described control information to a device such as an external interface which is not illustrated, via a non-illustrated network which is different from the slave control devices 30 and/or the first to third in-vehicle networks 10a to 10c, or may output to the server apparatus 50 via the above-described network.

For example, when the determination unit 104 determines that there is an anomaly in the master control device 20, the control unit 105 outputs, as control information, information that announces or urges terminating the in-vehicle network system 1 to the device such as an external interface and/or the server apparatus 50 without involving the master control device 20. In addition, when the determination unit 104 determines that the master control device 20 is free of an anomaly, the control unit 105 may output, to the master control device 20, control information which announces that the in-vehicle network system 1 can continue to operate, or may skip outputting of the control information.

Each of the above-described structural components, such as the obtaining unit 102, the determination unit 104, and the control unit 105 of the monitoring apparatus 100, the master control device 20, and the slave control devices 30 may be configured by a computer system (not illustrated) which includes, for example, a processor such as a central processing unit (CPU), a digital signal processor (DSP), etc. and a memory such as a random access memory (RAM), a read-only memory (ROM), etc. A part or all of the functions of each of the structural components may be achieved by a CPU or a DSP executing a program recorded on a ROM using a RAM as a working memory. In addition, a part or all of the functions of each of the structural components may be achieved by a dedicated hardware circuit such as an electronic circuit, an integrated circuit, etc. A part or all of the functions of each of the structural components may be achieved by a combination of the above-described software functions and hardware circuit. The program may be provided, as an application, through communications via a communication network such as the Internet, communications according to a mobile communication standard, other wireless network, wired network, broadcast, etc.

The storage 103 enables storing and extracting of various information items. The storage 103 is implemented by a storage device such as a semiconductor memory such as a ROM, a RAM, and a flash memory, a hard disk drive, a solid state drive (SSD), etc.

1-2. Operation of Monitoring Apparatus

Figure 4:
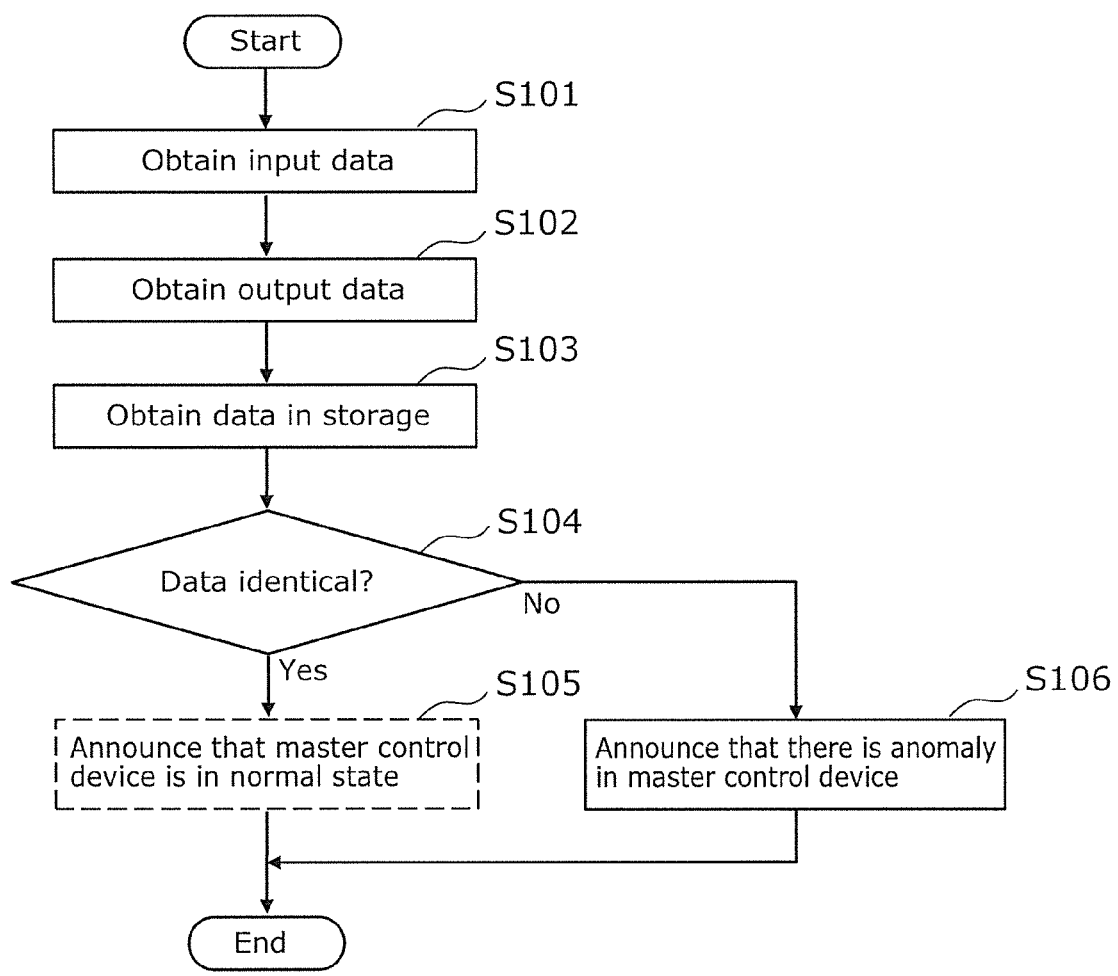
FIG. 4 is a flowchart which illustrates one example of an operation of the monitoring apparatus according to Embodiment 1.

The following describes an operation of the monitoring apparatus 100 according to Embodiment 1. FIG. 4 is a flowchart of one example of the operation of the monitoring apparatus 100 according to Embodiment 1. As illustrated in FIG. 4, in Step S101, the obtaining unit 102 of the monitoring apparatus 100 obtains input data from a signal provided by the slave control device 30 to the master control device 20.

Next, in Step S102, the obtaining unit 102 obtains output data corresponding to the above-described input data, from a signal provided to the slave control device 30 by the master control device 20 which has obtained the input data in Step S101. For example, the master control device 20 outputs the above-described signal to all of the first to third in-vehicle networks 10a to 10c. The obtaining unit 102 collates identification information of input data with identification information of data of a signal obtained from each of the first to third in-vehicle networks 10a to 10c, and thereby identifies output data corresponding to the above-described input data.

Next, in Step S103, the determination unit 104 of the monitoring apparatus 100 obtains, based on the identification information and contents of the input data obtained by the obtaining unit 102, contents of the output data corresponding to the identification information and contents of the input data, from determination data in storage 103.

Next, in Step S104, the determination unit 104 compares the contents of the output data obtained from the storage 103 with the contents of the output data obtained by the obtaining unit 102. The determination unit 104 proceeds to Step S105 when the contents of the two output data are identical (Yes in Step S104), and proceeds to Step S106 when the contents of the two output data are different (No in Step S104).

In Step S105, the control unit 105 of the monitoring apparatus 100 ends a series of processing of Step S101 to Step S105. The control unit 105 may announce that the master control device 20 is in a normal state. In this case, the control unit 105 outputs information announcing that the in-vehicle network system 1 can continue to operate, to the master control device 20.

In Step S106, the control unit 105 announces that there is an anomaly in the master control device 20. More specifically, the control unit 105 outputs information that announces or urges terminating the in-vehicle network system 1, to at least one of an external interface which is not illustrated or the server apparatus 50.

1-3. Advantageous Effects, Etc.

As described above, in the monitoring apparatus 100 according to Embodiment 1, the determination unit 104 determines presence or absence of an anomaly in the operation of the master control device 20, by comparing, with determination data in the storage 103, (i) input data provided to the master control device 20, which has been output from the slave control devices 30 to one of the first to third in-vehicle networks 10a to 10c and (ii) output data which has been provided by the master control device 20 to another one of the first to third in-vehicle networks 10a to 10c. Thus, the determination unit 104 determines presence or absence of an anomaly in the operation of the master control device 20, using data passing through different in-vehicle networks. Accordingly, the monitoring apparatus 100 enables monitoring of the master control device 20 communicatively coupled to a plurality of slave control devices 30, via different in-vehicle networks.

In addition, in the monitoring apparatus 100 according to Embodiment 1, the determination data in the storage 103 shows at least one of a relationship in which input data and output data are identical or a relationship in which output data is identical to a result of arithmetic processing applied to input data by the master control device 20. It is thus possible to readily and surely determine, based on determination data, presence or absence of an anomaly in the operation of the master control device 20.

Embodiment 2

The following describes a monitoring apparatus 200 according to Embodiment 2. Embodiment 2 differs from Embodiment 1 in that the monitoring apparatus 200 according to Embodiment 2 is included in the first slave control device 30aa. In Embodiment 2, the same reference numerals are assigned to the same structural components as in Embodiment 1 and the description for the structural components is omitted. The following describes mainly the difference from Embodiment 1, and the description for the same points is omitted.

2-1. Configuration of Monitoring Apparatus

Figure 5:
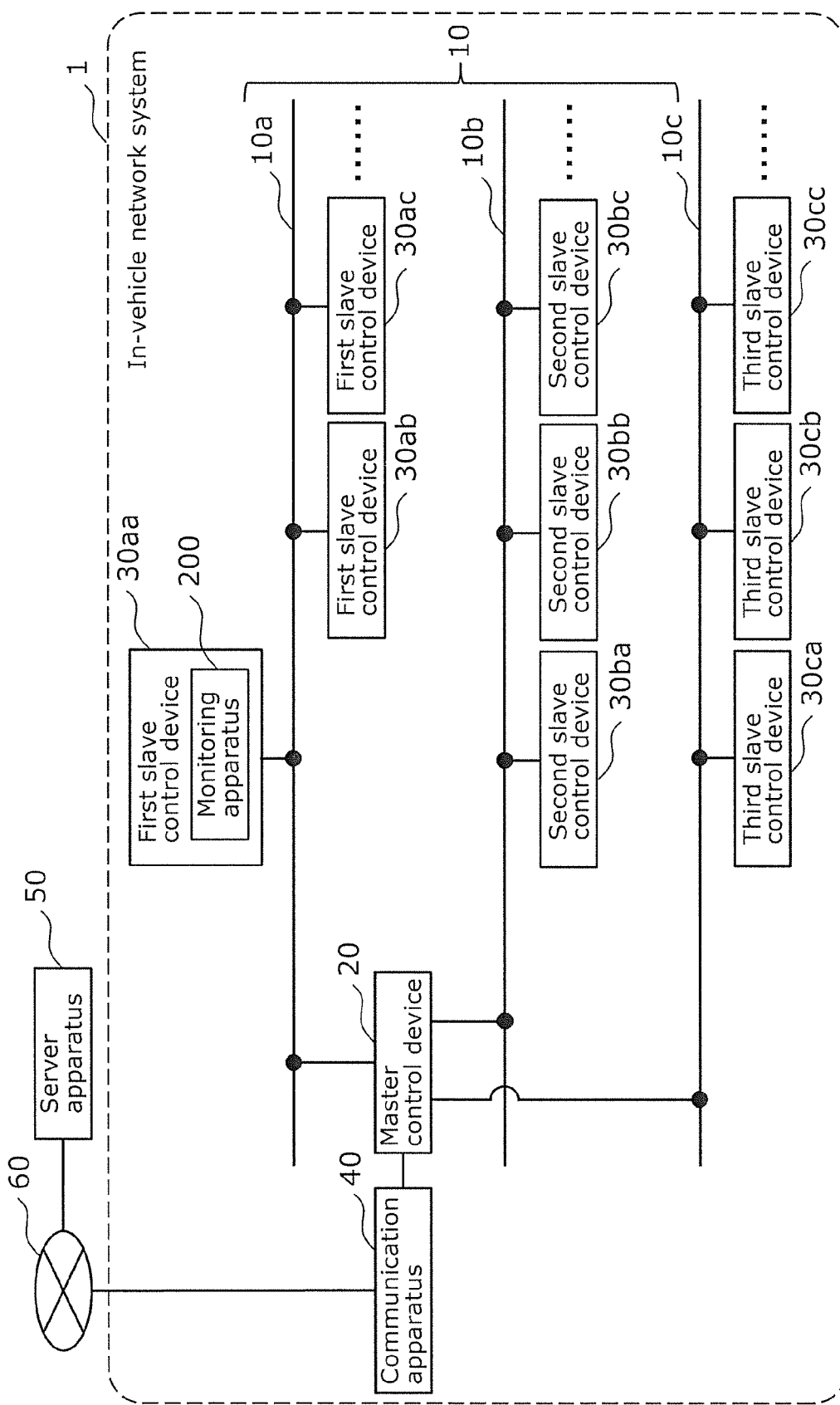
FIG. 5 is a block diagram which illustrates one example of a functional configuration of an in-vehicle network system including a monitoring apparatus according to Embodiment 2.
Figure 6:
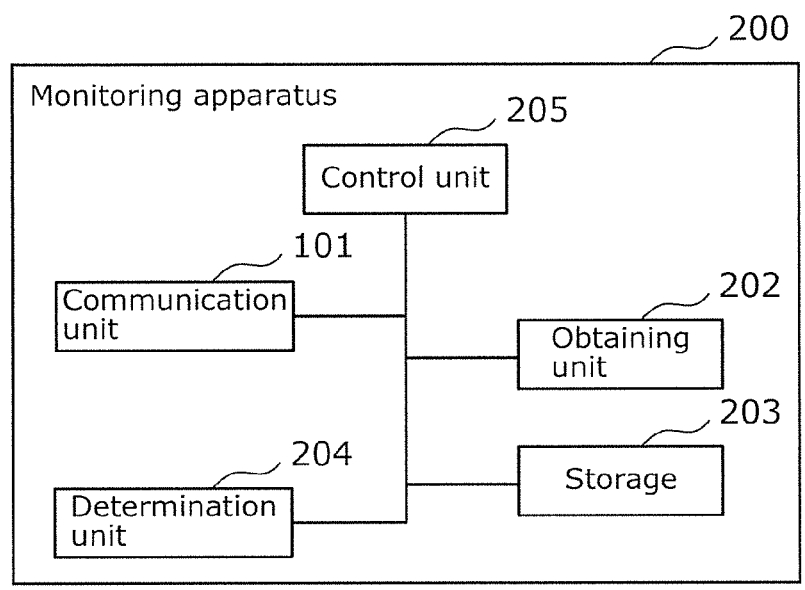
FIG. 6 is a block diagram which illustrates one example of a functional configuration of the monitoring apparatus according to Embodiment 2.

The following describes a configuration of the monitoring apparatus 200 according to Embodiment 2, with reference to FIG. 5 and FIG. 6. FIG. 5 is a block diagram which illustrates one example of a functional configuration of an in-vehicle network system 1 including the monitoring apparatus 200 according to Embodiment 2. FIG. 6 is a block diagram which illustrates one example of a functional configuration of the monitoring apparatus 200 according to Embodiment 2. According to the present embodiment, the monitoring apparatus 200 is included in one of the first slave control devices 30aa to 30ac, specifically, the first slave control device 30aa. The monitoring apparatus 200 includes a communication unit 101, an obtaining unit 202, a storage 203, a determination unit 204, and a control unit 205. The communication unit 101 is equivalent to the communication unit 101 described in Embodiment 1.

The obtaining unit 202 obtains contents of output data and identification information of the output data, from a signal provided by the master control device 20 and applied to the first slave control device 30aa via the first in-vehicle network 10a. The first slave control device 30aa receives all of the signals provided to the first in-vehicle network 10a by the master control device 20. Thus, the obtaining unit 202 obtains output data of all of the signals provided by the master control device 20 to the first in-vehicle network 10a.

The storage 203 stores determination data which indicates a correspondence relationship between data on the output data and identification information of the output data. The data on the output data is related to contents and an output state of the output data of the master control device 20 in the case where the master control device 20 is free of an anomaly. The determination data is set in advance and stored in the storage 203.

The determination data is data indicating an amount of change in output data provided by the master control device 20 at predetermined intervals, an output cycle of output data of the master control device 20, and the first slave control device 30aa that is the slave control device 30 which includes the monitoring apparatus 200, in the case where the master control device 20 is free of an anomaly.

For example, FIG. 7A, FIG. 7B, and FIG. 7C each illustrate one example of the determination data in the monitoring apparatus 200 according to Embodiment 2. As illustrated in FIG. 7A, in the determination data, the amount of change in output data sequentially obtained previously and this time, namely, a difference value, is defined in a predetermined range between a lower limit value and an upper limit value, as an output rule 1. The predetermined range of the difference value is associated with identification information of the output data and stored in the storage 203. As illustrated in FIG. 7B, the output cycle of output data is defined in a predetermined range between a lower limit value and an upper limit value, as an output rule 2. The output cycle of output data is associated with identification information of the output data, and stored in the storage 203.

As illustrated in FIG. 7C, data indicating the first slave control device 30aa including the monitoring apparatus 200 is defined as an output rule 3. More specifically, identification information of data when the first slave control device 30aa outputs the data is defined as a subject to be compared with the identification information of output data. Identification information of data that can be provided by the first slave control device 30aa is stored in the storage 203. Such output rule 3 defines validity of the slave control devices 30 which are subjects for receiving the output data.

The determination unit 204 determines presence or absence of an anomaly in an operation of the master control device 20, by determining whether the output data obtained by the obtaining unit 202 satisfies the determination data in the storage 203. The determination unit 204 determines that the master control device 20 is free of an anomaly when the determination data is satisfied, and determines that there is an anomaly in the master control device 20 when the determination data is not satisfied.

More specifically, the determination unit 204 identifies, in each of the tables illustrated in FIG. 7A to FIG. 7C, data related to output data, based on the identification information of the output data. In addition, in relation to FIG. 7A, the determination unit 204 calculates a difference value between a value of the output data and a value of output data obtained immediately before the output data. It should be noted that two output data which are the subjects for calculation of a difference value may have the same or different identification information. One example of the case where identification information of output data differs is the case where values of output data having different identification information change along with each other, and differences of such data fall within a certain range.

In addition, in relation to FIG. 7B, the determination unit 204 calculates an output cycle of output data, based on timing of outputting the output data by the master control device 20. More specifically, according to the present embodiment, the output cycle of input data is determined for each identification information. Examples of the output cycle include 10 ms, 20 ms, 50 ms, etc. Accordingly, the master control device 20 also outputs output data of each identification information at an output cycle equivalent to the output cycle of input data determined for each identification information. The determination unit 204 calculates the output cycle of output data for each identification information, based on the timing of outputting, by the master control device 20, the output data having the same identification information. It should be noted that the determination unit 204 may calculate an output cycle of output data between output data having different identification information, and such an output cycle can be defined by a predetermined range.

When the difference value falls within the range indicated in FIG. 7A, the determination unit 204 determines that the output rule 1 is satisfied. When the output cycle falls within the range indicated in FIG. 7B, the determination unit 204 determines that the output rule 2 is satisfied. When the identification information of output data is different from the identification information of data that can be provided by the first slave control device 30aa indicated in FIG. 7C, the determination unit 204 determines that the output rule 3 is satisfied. In other words, the determination unit 204 determines that the output rule 3 is satisfied when output data does not corresponds to the data output from the first slave control device 30aa. The determination unit 204 determines that the determination data is satisfied when all of the output rules 1 to 3 are satisfied, and that the determination data is not satisfied when at least one of the output rules 1 to 3 is not satisfied.

The output rule 1 is based on the fact that an anomaly can be found in the master control device 20 when the amount of change in output data is great. The output rule 2 is based on the fact that an operation is temporarily suspended when the master control device 20 receives an attack such as hacking. The output rule 3 is based on the fact that the first slave control device 30aa which include the monitoring apparatus 200 is different from the slave control device 30 which outputs input data corresponding to the output data. It should be noted that, although the determination unit 204 uses all of the output rules 1 to 3 according to the present embodiment, determination may be carried out using at least one of the output rules 1 to 3.

The control unit 205 controls the operations of the monitoring apparatus 200 as a whole, while controlling the operations of the communication unit 101, the obtaining unit 202, and the determination unit 204 in association with one another. In addition, the control unit 205 outputs a determination result of the determination unit 204 and/or control information based on the determination result, to the outside of the monitoring apparatus 200.

2-2. Operation of Monitoring Apparatus

Figure 8:
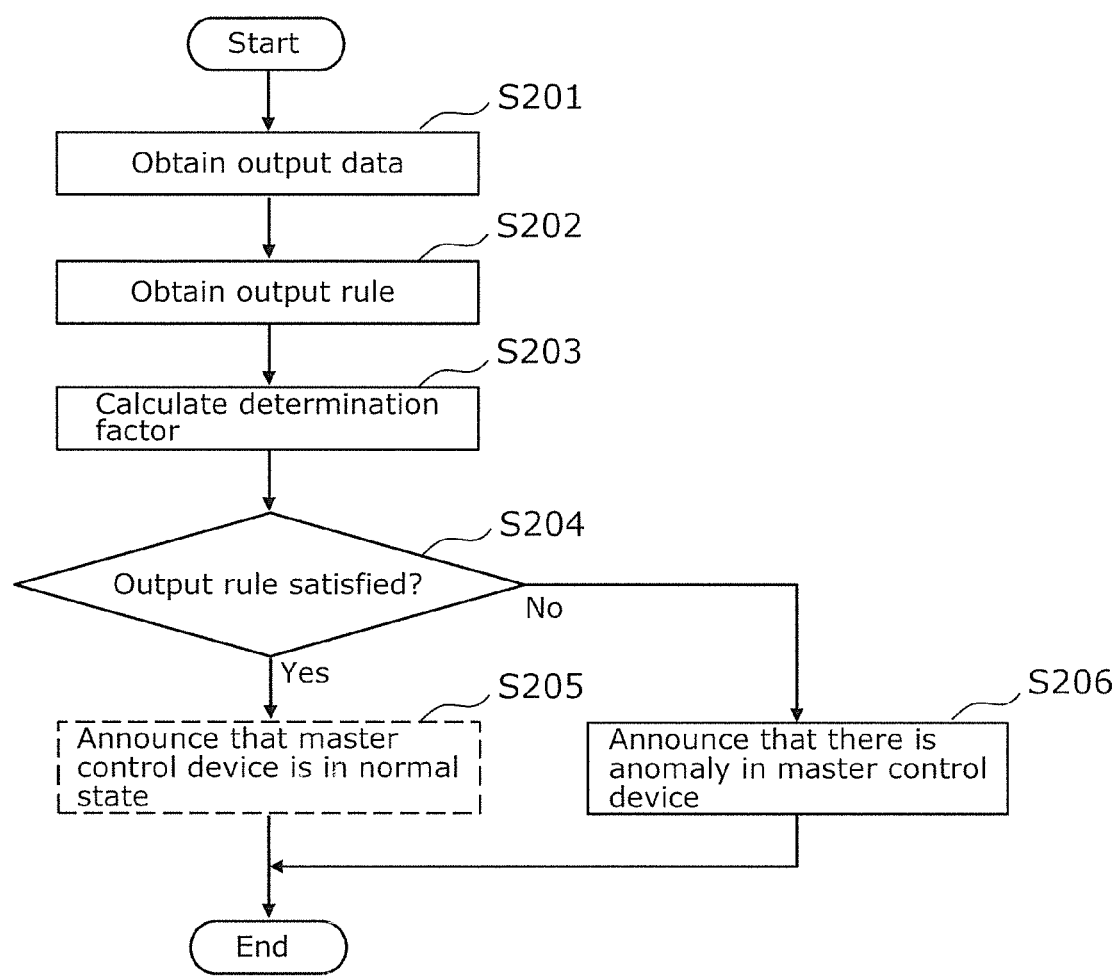
FIG. 8 is a flowchart which illustrates one example of an operation of the monitoring apparatus according to Embodiment 2.

The following describes an operation of the monitoring apparatus 200 according to Embodiment 2. FIG. 8 is a flowchart of one example of the operation of the monitoring apparatus 200 according to Embodiment 2. As illustrated in FIG. 8, in Step S201, the obtaining unit 202 of the monitoring apparatus 200 obtains output data from a signal which the master control device 20 receives from the first to third in-vehicle networks 10a to 10c and provides to the first in-vehicle network 10a. The first slave control device 30aa receives all of the signals provided to the first in-vehicle network 10a. Thus, the obtaining unit 202 obtains output data provided to all of the first slave control devices 30aa to 30ac.

Next, in Step S202, the determination unit 204 of the monitoring apparatus 200 obtains, from the storage 203, the output rules 1 and 2 each corresponding to identification information of the output data obtained by the obtaining unit 202. In addition, the determination unit 204 obtains the output rule 3 from the storage 203.

Next, in Step S203, the determination unit 204 calculates a difference value of output data from the output data obtained by the obtaining unit 202. In addition, the determination unit 204 calculates an output cycle of output data, from the timing of obtaining the output data by the obtaining unit 202. In other words, the determination unit 204 calculates a determination factor for determining presence or absence of an anomaly in the master control device 20.

Next, in Step S204, the determination unit 204 compares the output rules 1 to 3 obtained from the storage 203 with the difference value of output data, the output cycle of output data, and the identification information of output data. As described above, the determination unit 204 compares all of the output data provided to the first in-vehicle network 10a; that is, output data provide to all of the first slave control devices 30aa to 30ac, with the output rules 1 to 3.

The determination unit 204 proceeds to Step S205 when all of the output rules 1 to 3 are satisfied (Yes in Step S204), and proceeds to Step S206 when any of the output rules 1 to 3 is not satisfied (No in Step S204).

The processes to be performed in Steps S205 and S206 are equivalent to the processes performed in Steps S105 and S106 in Embodiment 1, respectively.

2-3. Advantageous Effects, Etc.

As described above, in the monitoring apparatus 200 according to Embodiment 2, the determination unit 204 determines presence or absence of an anomaly in an operation of the master control device 20, by comparing the determination data in storage 203 with the output data provided, by the master control device 20, to the slave control devices 30 via one of the first to third in-vehicle networks 10a to 10c. In addition, the master control device 20 can provide input data received from one of the first to third slave control devices, to another one of the first to third slave control devices as output data. Thus, the determination unit 204 can determine presence or absence of an anomaly in the operation of the master control device 20, using data passing through different in-vehicle networks. Accordingly, the monitoring apparatus 200 enables monitoring of the master control device 20 communicatively coupled to a plurality of slave control devices 30 via different in-vehicle networks. It should be noted that, although the monitoring apparatus 200 according to Embodiment 2 is included in the first slave control device 30aa, the monitoring apparatus 200 may be included in any of the other slave control devices.

In addition, in the monitoring apparatus 200 according to Embodiment 2, the determination data in the storage 203 is at least one of an amount of change in output data, an output cycle of outputting data by the master control device 20, or data on the first slave control device 30aa which includes the monitoring apparatus 200. It is thus possible to readily and surely determine presence or absence of an anomaly in the operation of the master control device 20, based on the determination data.

Embodiment 3

Embodiment 3 differs from Embodiment 1 in that a monitoring apparatus 300 according to Embodiment 3 obtains information from an information transmitter 70 different from the first to third in-vehicle networks 10a to 10c. In Embodiment 3, the same reference numerals are assigned to the same structural components as in Embodiment 1 or 2 and the description for the structural components is omitted. The following describes mainly the difference from Embodiments 1 and 2, and the description for the same points as Embodiments 1 and 2 is omitted.

Figure 9:
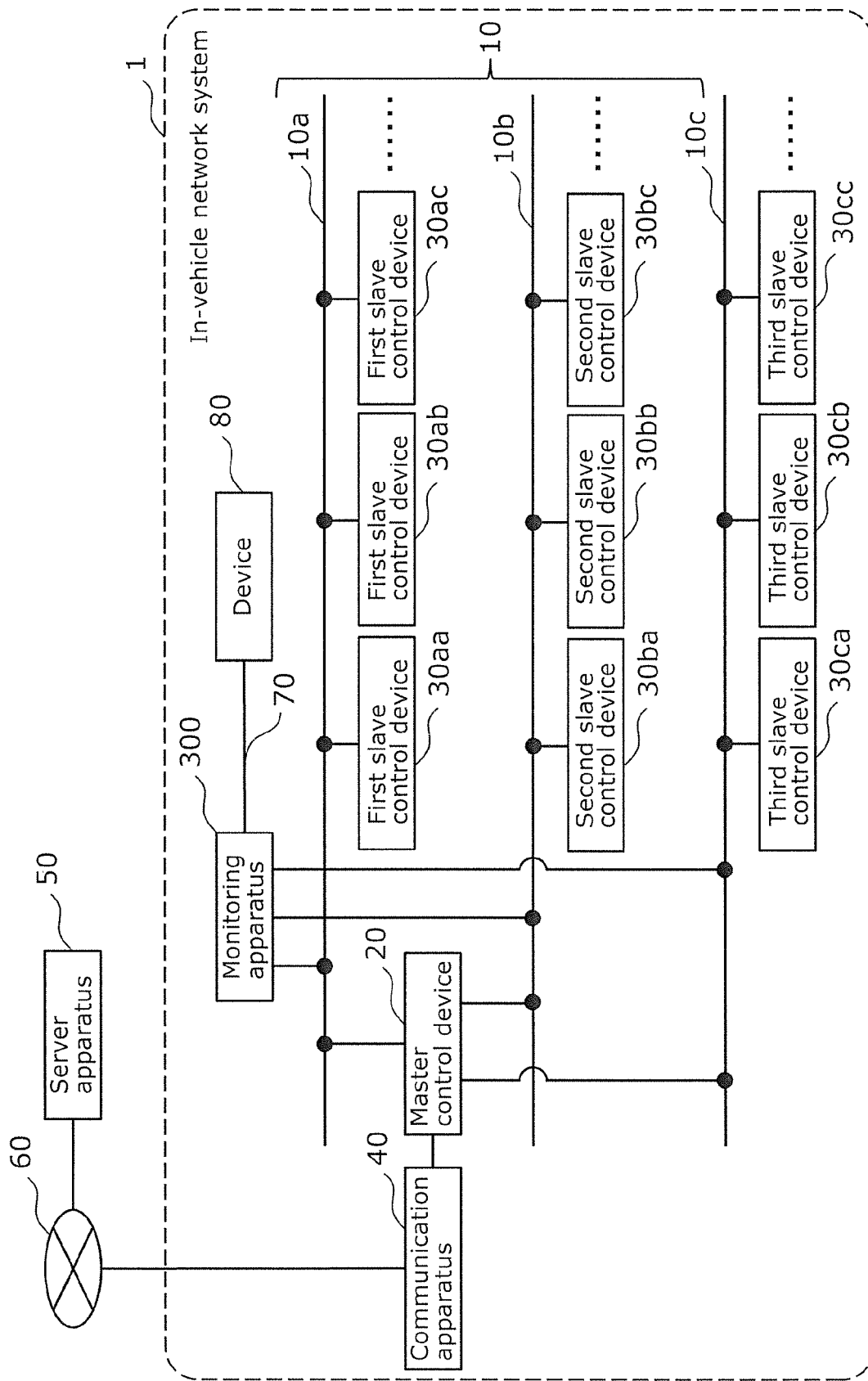
FIG. 9 is a block diagram which illustrates one example of a functional configuration of an in-vehicle network system including a monitoring apparatus according to Embodiment 3.
Figure 10:
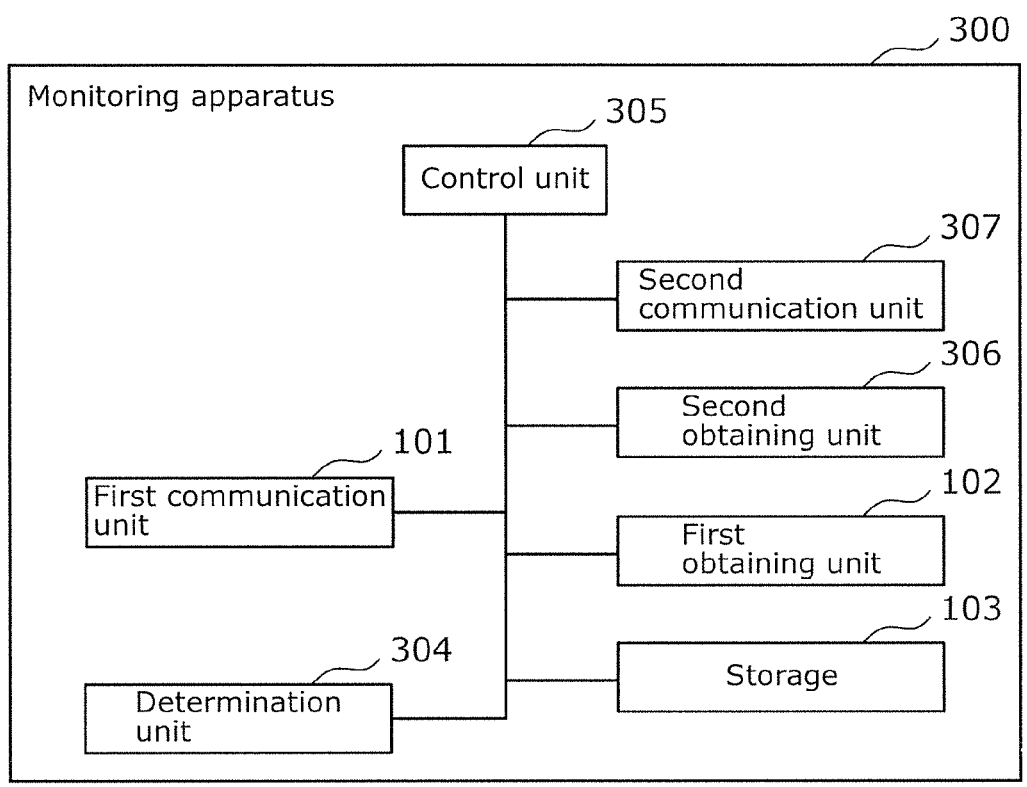
FIG. 10 is a block diagram which illustrates one example of a functional configuration of the monitoring apparatus according to Embodiment 3.

The following describes the monitoring apparatus 300 according to Embodiment 3, with reference to FIG. 9 and FIG. 10. FIG. 9 is a block diagram which illustrates one example of a functional configuration of an in-vehicle network system 1 including the monitoring apparatus 300 according to Embodiment 3. FIG. 10 is a block diagram which illustrates one example of a functional configuration of the monitoring apparatus 300 according to Embodiment 3. The monitoring apparatus 300 is communicatively coupled to each of the first to third in-vehicle networks 10a to 10c, in the same manner as Embodiment 1. In addition, the monitoring apparatus 300 includes a communication unit 101 as a first communication unit, an obtaining unit 102 as a first obtaining unit, a storage 103, a determination unit 304, a control unit 305, a second obtaining unit 306, and a second communication unit 307.

The second communication unit 307 transmits and receives data between the information transmitter 70 and the monitoring apparatus 300. The second communication unit 307 may include a communication circuit. The information transmitter 70 constitutes an information transmission path such as an Ethernet (registered trademark) bus, a local bus, a direct line, etc., and is communicatively coupled to a device 80 of various kinds in the vehicle. The information transmitter 70 transmits data including information provided by the device 80, to the monitoring apparatus 300. The second obtaining unit 306 obtains output information of the device 80 via the information transmitter 70 and the second communication unit 307.

The determination unit 304 determines to which one of the slave control devices 30 the output information of the device 80 obtained by the second obtaining unit 306 is related. For example, the output information may include information such as identification information of related one of the slave control devices 30, and the determination unit 304 may identify, based on the information included in the output information, the one of the slave control devices 30 related to the output information. Alternatively, the storage 103 may store in advance data indicating a correspondence relationship between output information and one of the slave control devices 30 related to the output information, and the determination unit 304 may identify the one of the slave control devices 30 related to the output information, by collating the output information and the data indicating the correspondence relationship.

In addition, the determination unit 304 processes, based on output information, at least one of (i) contents such as a value of output data provided by the master control device 20 which is obtained by the first obtaining unit 102 or (ii) contents such as a value of output data corresponding to the above-described output data stored in the storage 103. The determination unit 304 corrects at least one of (i) the contents of the output data obtained by the first obtaining unit 102 or (ii) the contents of the output data stored in the storage 103, according to the output information.

For example, the output information of the device 80 may indicate presence or absence of an anomaly in the slave control device 30. When output information indicating occurrence of an anomaly in the slave control device 30 which has provided input data corresponding to the output data of the master control device 20 or the slave control device 30 which obtains the output data provided by the master control device 20 is obtained, the determination unit 304 may correct at least one of a value of output data provided by the master control device 20 or a value of output data in the storage 103, so as to ensure consistency between the values of the two output data, specifically, to make the values of the two output data identical. In this manner, the determination unit 304 can determine an anomaly in the slave control device 30 as an anomaly in the master control device 20, and thus it is possible to improve accuracy in determination.

It should be noted that the master control device 20 may also be communicatively coupled to the device 80 via the information transmitter 70 or a different information transmitter. In this case, the master control device 20 may obtain output information of the device 80 via the information transmitter, and output, as output data, data resulting from processing, based on the output information, input data obtained from the slave control device 30. The determination unit 304 may compare (i) data resulting from processing, based on the output information obtained by the second obtaining unit 306, output data stored in the storage 103, with (ii) output data which is obtained from the master control device 20 and processed based on output information.

In addition, the control unit 305 controls the operations of the monitoring apparatus 300 as a whole, while controlling the operations of the first communication unit 101, the first obtaining unit 102, the determination unit 304, the second obtaining unit 306, and the second communication unit 307 in association with one another. In addition, the control unit 305 outputs a determination result of the determination unit 304 and/or control information based on the determination result, to the outside of the monitoring apparatus 300.

With the monitoring apparatus 300 according to Embodiment 3 as described above, it is possible to yield advantageous effects equivalent to the advantageous effects yielded by the monitoring apparatus 100 according to Embodiment 1. In addition, the information obtained by the second obtaining unit 306 may include information related to the slave control device 30 that has output the input data corresponding to the output data. The data resulting from processing, based on such information obtained by the second obtaining unit 306, the output data obtained by the first obtaining unit 102 can be data in which impact of an anomaly, an accident, etc. in the slave control device 30 or in a device communicatively coupled to the slave control device 30 on output data is taken into consideration. With this, the determination unit 304 is capable of reducing false detection of an anomaly in an operation of the master control device 20 due to above-described impact. Accordingly, the monitoring apparatus 300 is capable of improving accuracy in determining anomaly in an operation of the master control device 20.

Figure 11:
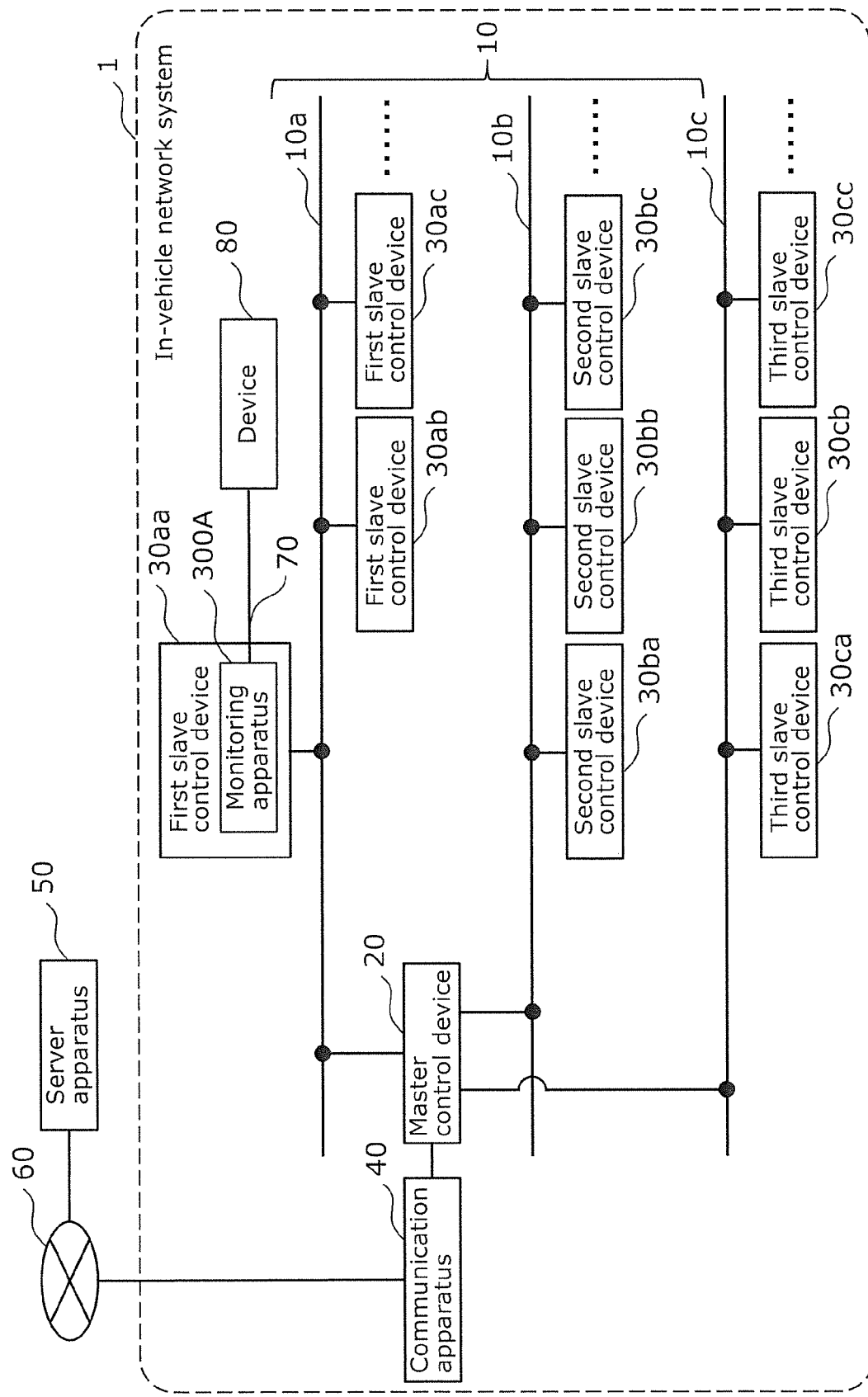
FIG. 11 is a block diagram which illustrates one example of a functional configuration of an in-vehicle network system including a monitoring apparatus according to a variation of Embodiment 3.

In addition, although the monitoring apparatus 300 according to the present embodiment is applied to the in-vehicle network system 1 according to Embodiment 1, the monitoring apparatus 300 may be applied to the in-vehicle network system according to Embodiment 2 as illustrated in FIG. 11. In this case, the determination unit 304 processes, based on output information, at least one of (i) contents of output data provided by the master control device 20 which is obtained by the first obtaining unit 102 or (ii) contents of output data corresponding to the above-described output data stored in the storage 103. FIG. 11 is a block diagram which illustrates one example of a functional configuration of the in-vehicle network system 1 including a monitoring apparatus 300A according to a variation of Embodiment 3.

Others

Although the monitoring apparatus, etc. according to one or more aspects of the present disclosure have been described above based on the embodiments and variations, the present disclosure is not limited to the above-described embodiments and variations. Other forms in which various modifications apparent to those skilled in the art are applied to the embodiments and variations, or forms structured by combining structural components of different embodiments and variations may be included within the scope of one or more aspects of the present disclosure, unless such changes and variations depart from the scope of the present disclosure.

For example, in the monitoring apparatus according to the embodiments and variations, input data and output data include identification information such as a CAN ID of the input data and a CAN ID of the output data, respectively. The determination unit of the monitoring apparatus associates (i) the input data and the output data, (ii) the input data and the slave control device 30, and (iii) the output data and the slave control device 30, by comparing the identification information of the input data that is provided by the slave control device 30 with the identification information of the output data that is provided by the master control device 20. However, the above-described association is not limited to the examples described above. For example, the determination unit may perform above-described association by collating the contents of the input data with the contents of the output data. In addition, the slave control device 30 may include identification information of the slave control device 30 into input data, or may include, into input data, identification information of another slave control device 30 that is a subject of execution of the input data. The determination unit may perform the above-described association on the basis of the identification information of the slave control device 30.

In addition, as described above, these techniques of the present disclosure may be implemented using a system, an apparatus, a method, an integrated circuit, a computer program, or a computer-readable recording medium such as a recording disk, or any combination of systems, apparatuses, methods, integrated circuits, computer programs, or computer-readable recording media. The computer-readable recording medium includes, for example, a non-volatile recording medium such as a compact disc-read only memory (CD-ROM).

For example, each of the processing units included in the foregoing embodiments and variations are typically implemented as a large scale integration (LSI) which is an integrated circuit. They may be realized as a single chip one-by-one, or as a single chip to include part or all of them.

In addition, the integrated circuit is not limited to an LSI, and it may be implemented as a dedicated circuit or a general-purpose processor. A field programmable gate array (FPGA) that is programmable after an LSI is manufactured or a reconfigurable processor that is capable of reconfiguring connection and setting of circuit cells inside an LSI may be employed.

It should be noted that, each of the structural components in the above-described embodiments and variations may be configured in the form of a dedicated hardware product, or may be implemented by executing a software program suitable for the structural component. Each of the structural components may be implemented by means of a program executing unit, such as a CPU and a processor, reading and executing the software program recorded on a recording medium such as a hard disk or a semiconductor memory.

In addition, a part or all of the above-described structural components may be configured as an integrated circuit (IC) card which can be attached and detached or as a stand-alone module. The IC card or the module is a computer system including a microprocessor, a ROM, a RAM, etc. The IC card or the module may include the above-described LSI or system LSI. The IC card or the module achieves its function through the microprocessor's operation according to the computer program. The IC card or the module may also be implemented to be tamper-resistant.

The monitoring method according to the present disclosure may be implemented by a processor such as a micro processing unit (MPU) and CPU, a circuit such as an LSI, an IC card or a stand-alone module, etc.

In addition, the technique according to the present disclosure may be implemented by a software program or a digital signal including a software program, or a non-transitory computer-readable recording medium having a program recorded thereon. It should be understood that the above-described program can be distributed via a transmission medium such as the Internet.

In addition, each of the numerals such as ordinal numbers and numerical quantities used in the above description is used for exemplification to specifically describe the technique of the present disclosure, and the present disclosure is not limited by the numerals used for exemplification. In addition, the relation of connection between the structural components is used for exemplification to specifically describe the technique of the present disclosure, and the relation of connection which implements the functions of the present disclosure is not limited to this.

Furthermore, the division of the functional blocks illustrated in the block diagrams has been presented as one example. Accordingly, a plurality of functional blocks may be implemented as one functional block, or one functional block may be divided into a plurality of functional blocks or a portion of the functions may be transferred to another functional block. In addition, functions of a plurality of functional blocks having similar functions may be processed by single hardware or software in parallel or in time division.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Thus, such modifications and other embodiments are also included in the exemplary disclosure.

INDUSTRIAL APPLICABILITY

The technique of the present disclosure is useful in monitoring a master control device which communicatively couples a plurality of networks such as an in-vehicle network. It should be noted that, although the present disclosure has been described as applicable to security measures in the in-vehicle network included in an automobile in the foregoing embodiments, the scope of the application is not limited to this. For example, the present disclosure may be applied not only to automobiles but also to mobility such as construction machineries, agricultural machineries, vessels, railroads, airplanes, etc.

The invention claimed is:

1. A monitoring apparatus which monitors an operation of a master control device,
the master control device being communicatively coupled to a first slave control device via a first network and to a second slave control device via a second network, the master control device providing output data to the first slave control device based on input data received from the second slave control device,
the monitoring apparatus being communicatively coupled to the first network and the second network, the monitoring apparatus comprising:
a storage which stores determination data indicating a correspondence relationship between the input data and the output data; and
at least one of a processor or a circuit configured to obtain the input data and the output data, and
the at least one of the processor or the circuit further configured to determine a presence or an absence of an anomaly in the operation of the master control device, by determining whether the input data and the output data correspond to the determination data, wherein
the at least one of the processor or the circuit is further configured to obtain information that indicates a presence or an absence of an anomaly in at least one of the first slave control device or the second slave control device from an information transmitter provided separately from the first network and the second network, and
the at least one of the processor or the circuit is further configured to determine, based on the information that indicates the presence or the absence of the anomaly in at least one of the first slave control device or the second slave control device obtained from the information transmitter, whether data resulting from processing the output data corresponds to the determination data stored in the storage, the output data being provided by the master control device to the first slave control device based on the input data received from the second slave control device.

2. The monitoring apparatus according to claim 1, wherein
the determination data indicates at least one of a relationship in which the input data and the output data are identical or a relationship in which the output data is identical to a result of arithmetic processing applied to the input data by the master control device.

3. The monitoring apparatus according to claim 1, wherein
the first network and the second network are bus networks.

4. The monitoring apparatus according to claim 1, wherein
the master control device is a gateway.

5. The monitoring apparatus according to claim 1, further comprising:
a communication circuit configured to transmit control information to an external interface via a third network different than the first network and the second network in response to the presence of the anomaly in the operation of the master control device being determined by the at least one of the processor or the circuit.

6. The monitoring apparatus according to claim 5, wherein
the control information transmitted to the external interface announces or requests termination of a system, the system including the monitoring apparatus.

7. The monitoring apparatus according to claim 6, wherein
the communication circuit is configured to transmit the control information to the external interface without involving the master control device.

8. The monitoring apparatus according to claim 7, wherein
the system, including the monitoring apparatus, is an in-vehicle network system, and each of the first slave control device and the second slave control device control an operation of a vehicle, the vehicle including the in-vehicle network system.

9. The monitoring apparatus according to claim 8, wherein
the external interface and the third network are external to the vehicle.

10. The monitoring apparatus according to claim 1, further comprising:
a communication circuit configured to transmit control information to the master control device in response to the absence of the anomaly in the operation of the master control device being determined by the at least one of the processor or the circuit.

11. The monitoring apparatus according to claim 10, wherein
the control information transmitted to the master control device announces that a system is configured to continue to operate, the system including the monitoring apparatus.

12. The monitoring apparatus according to claim 1, wherein
the first network includes a plurality of the first slave control device,
the second network includes a plurality of the second slave control device,
the first network does not connect the master control device to the plurality of the first slave control device on a one-to-one basis, and
the second network does not connect the master control device to the plurality of the second slave control device on a one-to-one basis.

13. The monitoring apparatus according to claim 1, wherein
the determination data stored in the storage indicates a plurality of correspondence relationships between the input data and the output data, the plurality of correspondence relationships including both without applying arithmetic processing to the input data and with applying arithmetic processing to the input data.

14. A monitoring apparatus which monitors an operation of a master control device,
the master control device being communicatively coupled to a first slave control device via a first network and to a second slave control device via a second network, the master control device providing output data to the first slave control device based on input data received from the second slave control device,
the monitoring apparatus being included in the first slave control device, the monitoring apparatus comprising:
a storage which stores determination data on the output data; and
at least one of a processor or a circuit configured to:
obtain the output data; and
determine a presence or an absence of an anomaly in the operation of the master control device, by determining whether the output data corresponds to the determination data, wherein
the at least one of the processor or the circuit is further configured to obtain information that indicates a presence or an absence of an anomaly in at least one of the first slave control device or the second slave control device from an information transmitter provided separately from the first network and the second network, and
the at least one of the processor or the circuit is further configured to determine, based on the information that indicates the presence or the absence of the anomaly in at least one of the first slave control device or the second slave control device obtained from the information transmitter, whether data resulting from processing the output data corresponds to the determination data stored in the storage, the output data being provided by the master control device to the first slave control device based on the input data received from the second slave control device.

15. The monitoring apparatus according to claim 14, wherein
the determination data indicates at least one of an amount of change in the output data, an output cycle at which the master control device provides the output data, or data on the first slave control device including the monitoring apparatus.

16. A monitoring method for monitoring an operation of a master control device,
the master control device being communicatively coupled to a first slave control device via a first network and to a second slave control device via a second network, the master control device providing output data to the first slave control device based on input data received from the second slave control device,
the monitoring method comprising:
obtaining, by at least one of a processor or a circuit, the input data and the output data; and
determining, by the at least one of the processor or the circuit, a presence or an absence of an anomaly in the operation of the master control device, by determining whether the input data and the output data correspond to determination data, the determination data indicating a correspondence relationship between the input data and the output data;
obtaining, by the at least one of the processor or the circuit, information that indicates a presence or an absence of an anomaly in at least one of the first slave control device or the second slave control device from an information transmitter provided separately from the first network and the second network; and
further determining, by the at least one of the processor or the circuit, based on the information that indicates the presence or the absence of the anomaly in at least one of the first slave control device or the second slave control device obtained from the information transmitter, whether data resulting from processing the output data corresponds to the determination data, the output data being provided by master control device to the first slave control device based on the input data received from the second slave control device.

17. A non-transitory computer-readable recording medium for a computer, the non-transitory computer-readable recording medium including a computer program for causing the computer to execute the monitoring method according to claim 16.

18. A monitoring method for monitoring an operation of a master control device,
the master control device being communicatively coupled to a first slave control device via a first network and to a second slave control device via a second network, the master control device providing output data to the first slave control device based on input data received from the second slave control device, the monitoring method comprising:
- obtaining, by at least one of a processor or a circuit, the output data;
- determining, by the at least one of the processor or the circuit, a presence or an absence of an anomaly in the operation of the master control device, by determining whether the output data corresponds to determination data on the output data;
- obtaining, by the at least one of the processor or the circuit, information that indicates a presence or an absence of an anomaly in at least one of the first slave control device or the second slave control device from an information transmitter provided separately from the first network and the second network; and
- further determining, by the at least one of the processor or the circuit, based on the information that indicates the presence or the absence of the anomaly in at least one of the first slave control device or the second slave control device obtained from the information transmitter, whether data resulting from processing the output data corresponds to the determination data, the output data being provided by master control device to the first slave control device based on the input data received from the second slave control device.

19. A non-transitory computer-readable recording medium for use in a computer, the non-transitory computer-readable recording medium including a computer program for causing the computer to execute the monitoring method according to claim 18.

\* \* \* \* \*